Feb. 21, 1950     C. SUNDSTROM     2,498,187
SUGAR BELL MOLD
Filed Sept. 22, 1947
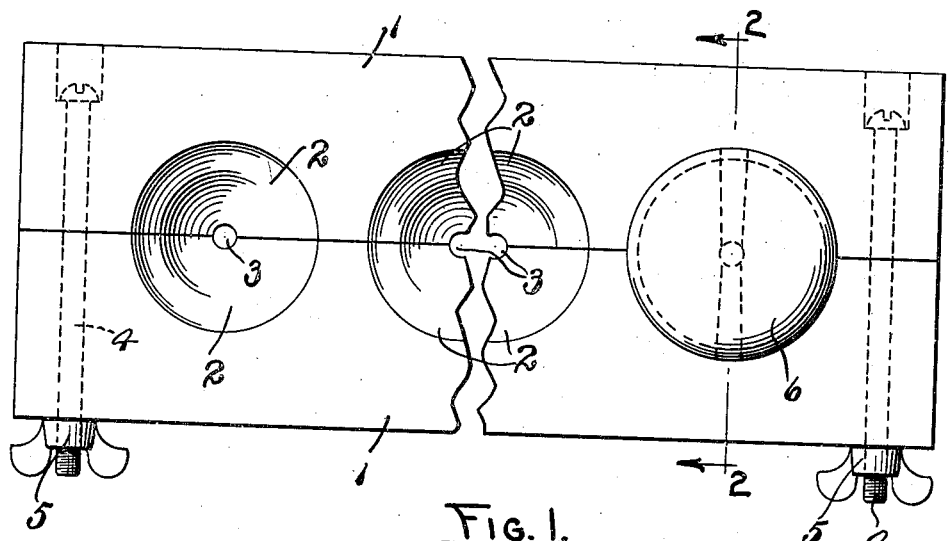
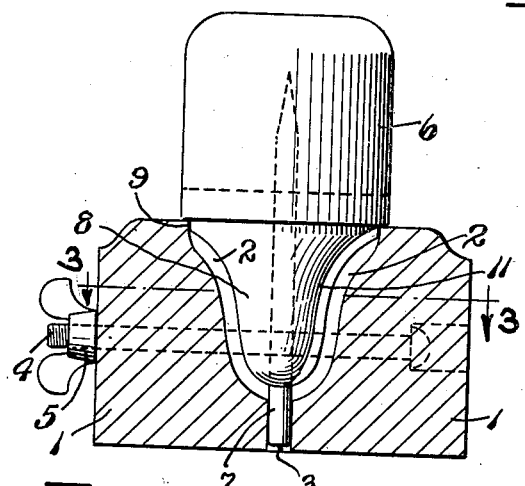
Fig. 2.
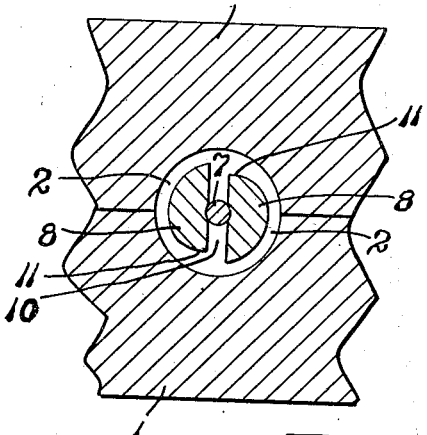
Fig. 3.
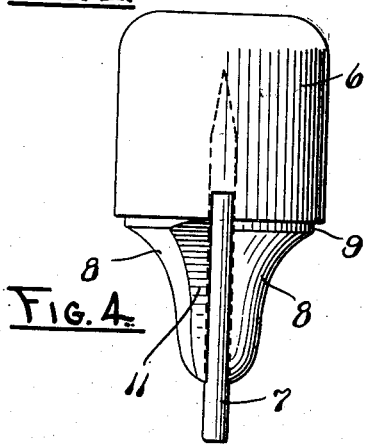
Fig. 4.
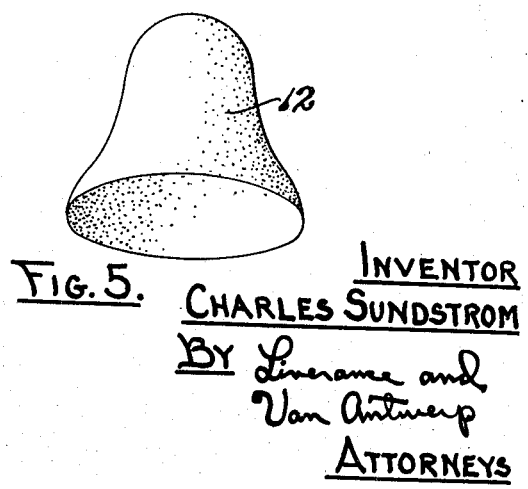
Fig. 5.
INVENTOR
CHARLES SUNDSTROM
BY Liverance and
Van Antwerp
ATTORNEYS Patented Feb. 21, 1950

2,498,187

UNITED STATES PATENT OFFICE 2,498,187

SUGAR BELL MOLD

Charles Sundstrom, Grand Rapids, Mich., assignor to Processing Specialties, Inc., Grand Rapids, Mich., a corporation of Michigan Application September 22, 1947, Serial No. 775,527

1 Claim. (Cl. 107—19)

This invention relates to a mold and method for production of sugar bells which, having a bell form, are used as edible decorative confectionery in the finishing of certain types of desserts, for example, cakes and the like.

My present invention has for its object and purpose a mold in which sugar bells, each requiring a relatively small amount of material, may be quickly and effectively produced and all excess material saved. The economy in production both from a minimum of material required and labor and other costs, will be evident.

An understanding of the invention may be had from the following description, taken in connection with the accompanying drawing, in which, Fig. 1 is a plan view of the bottom member of the mold, the intermediate portion thereof being broken away for lack of space, Fig. 2 is a transverse vertical section substantially on the plane of line 2—2 of Fig. 1, Fig. 3 is a horizontal section on the plane of line 3—3 of Fig. 2, Fig. 4 is an elevation of one of the upper bell-shaping members of the mold, and Fig. 5 is a perspective view of a sugar bell which is produced.

Like reference characters refer to like parts in the different figures of the drawing.

The lower part of the mold includes two parallel horizontal bars 1, which are located side by side, and are provided with downwardly extending recesses 2 which are in conjunction with each other when the bars 1 are together, as in Fig. 1, making bell shape recesses which control the outer form of the sugar bells produced. At the bottom of each of said recesses a vertical guide opening 3 is made, as shown. The number of the mold cavities or recesses thus produced in the length of the lower mold member may be varied and the invention is not limited in any respect to the number of mold cavities that there may be. The two bars are releasably secured together by bolts 4, with thumb nuts 5, the bolts extending through the end portions of the bars 1 with a thumb nut screwed on to one end of each of said bolts.

The upper mold member, one for each mold cavity, comprises a cylindrical dome-like body 6, centrally of which is a vertical pin 7 to extend down to the vertical opening 3 and enter it. At the lower side of the upper member 6, which is of a larger dimension than the largest upper dimension of a mold cavity, two projections 8 extend downwardly, one at each side of the pin 7. At their upper end portions the projections 8 have a short vertical ledge 9, which is received within the upper end of a mold cavity, rather closely fitting it, so that an upper member of the mold may be turned about a central vertical axis and is guided and held in turning movements by the lower end of the pin 7 in the vertical opening 3 and the annular ledge 9 within the upper end of the mold cavity.

The two downwardly extending projections 8 are separated from each other by a vertical slot 10. They are shaped complementary to the bell-like shape of the mold cavity, but with their surfaces spaced from the walls of a mold cavity, leaving a narrow continuous annular space, the width of which is the thickness of the sugar bell produced.

The annular surfaces of the projections 8 over the greater portions of their areas are concentric, at any horizontal section, with the adjacent surface of the mold cavities 2. But each, as best shown in Fig. 3, from the slot 10 at one side and extending away therefrom, is cut away as indicated at 11. Such cut away portions are at opposite ends of the slot 10 on the two parts 8.

In the use of the mold a quantity of the material from which the sugar bell is made, which material in practice is largely of sugar with suitable binding material to make a plastic mass, is placed in each of the mold cavities provided by the recesses at 2, and thereafter the upper members pushed into the mold cavities from their upper sides with the pins 7 received and guided in the vertical openings 3. The dome 6, which may be used as a handle or knob, of each is grasped and turned in a clockwise direction (referring to Fig. 3). The outwardly projecting edges of the members 8 extending beyond the adjacent surfaces 11 of the opposite member 8, serve to shape the material at the inner side and smooth the inside of the bell which is produced. Any excess material is received within the two parts of the slot 10 at opposite sides of the pin 7. After the turning operation has been performed, the upper member is removed and a bell-shaped confectionary article of the sugar material left in the mold cavity. They may be removed from the mold by loosening the thumb nuts 5 and separating the two bars 1.

A bell 12 of relatively thin walls is produced in a completed finished form. There is an evident saving of material over what would be required if the mold cavities at 2 were filled solidly. The operation is a rapid one, the turning of the shaping member for the inner side of the bell being by a very few turning movements. Excess material which has been received in the slot 10 is shaken or jarred loose into a receptacle to receive it and may be returned to the main supply of material without loss.

The invention is defined in the appended claim and is to be considered comprehensive of all forms of structure coming within its scope.

I claim:

A mold comprising a body having a mold cavity therein extending from its upper side downwardly and adapted to receive an excess of material to be molded, and a member cooperating therewith having an upper portion to extend above said body for manual engagement to turn it, and a portion extending downwardly to enter said mold cavity, said downwardly extending portion being smaller than the mold cavity, a radially extending substantially vertical groove in said downwardly extending portion, one edge of said groove extending radially outwardly beyond the other edge thereof, and means for centering said member in said mold cavity.

CHARLES SUNDSTROM.

REFERENCES CITED

The following references are of record in the file of this patent:

UNITED STATES PATENTS

| Number | Name | Date |
| --- | --- | --- |
| D. 16,840 | Drucklieh | Aug. 3, 1886 |
| 449,869 | Ball | Apr. 7, 1891 |
| 2,053,926 | Suiter | Sept. 8, 1936 |

FOREIGN PATENTS

| Number | Country | Date |
| --- | --- | --- |
| 252,099 | Germany | Oct. 18, 1912 |
| 742,997 | France | Jan. 6, 1933 |